United States Patent
Yamaguchi et al.

(10) Patent No.: US 7,350,158 B2
(45) Date of Patent: Mar. 25, 2008

(54) ICON DISPLAY SYSTEM AND METHOD, ELECTRONIC APPLIANCE, AND COMPUTER PROGRAM

(75) Inventors: Kosuke Yamaguchi, Kanagawa (JP); Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 769 days.

(21) Appl. No.: 10/772,665

(22) Filed: Feb. 5, 2004

(65) Prior Publication Data

US 2004/0155907 A1  Aug. 12, 2004

(30) Foreign Application Priority Data

Feb. 7, 2003 (JP) ............... P2003-030943
Feb. 21, 2003 (JP) ............... P2003-043970

(51) Int. Cl.
*G06F 3/048* (2006.01)
(52) U.S. Cl. .............. 715/834; 715/814; 715/825; 715/828; 715/835
(58) Field of Classification Search ............... 715/814, 715/817, 826, 828, 834, 835, 855, 825
See application file for complete search history.

(56) References Cited

U.S. PATENT DOCUMENTS 5,926,178 A * 7/1999 Kurtenbach ............ 715/834
6,239,803 B1 * 5/2001 Driskell ............... 715/810
6,388,686 B1 * 5/2002 Hetherington et al. ...... 715/810
2004/0250217 A1 * 12/2004 Tojo et al. ............... 715/810

FOREIGN PATENT DOCUMENTS

| JP | A 09-101874 | 4/1997 |
| JP | A 11-327741 | 11/1999 |
| JP | A 2000-231371 | 8/2000 |
| JP | A 2000-283782 | 10/2000 |
| JP | A 2002-196867 | 7/2002 |

\* cited by examiner

*Primary Examiner*—John Cabeca
*Assistant Examiner*—Ting Zhou
(74) *Attorney, Agent, or Firm*—Finnegan, Henderson, Farabow, Garrett & Dunner, L.L.P.

(57) ABSTRACT

An icon display system is provided in which an icon train selectable on an icon menu screen is managed by a display icon management table and non-display icon management table to visualize a part of the entire icon train. This is done by disposing the visualized icon train in an orbit while holding the other part of the icon train as invisible icons on the screen and displaying the invisible icons by moving the icon train in the orbit. Some icons are made to visually disappear at a discontinuity of the orbit by moving the icon train in the orbit and the new icons can be made to appear at the discontinuity to the screen. With this system, patterns of individual icons can be prevented from being indiscernible from each other no matter how many icons are set selectable on the display screen.

10 Claims, 14 Drawing Sheets

ICON DISPLAY SYSTEM AND METHOD, ELECTRONIC APPLIANCE, AND COMPUTER PROGRAM

BACKGROUND OF THE INVENTION

1. Field of the Invention

The present invention relates to a system and method for rendering an icon corresponding to an individual function on a display screen, an electronic appliance capable of displaying an icon menu on a display screen and calling a function to be performed by selecting a corresponding icon, and a computer program.

This application claims the priority of the Japanese Patent Application Nos. 2003-030943 filed on Feb. 7, 2003 and 2003-043970 filed on Feb. 21, 2003, the entireties of which are incorporated by reference herein.

2. Description of the Related Art

The GUI (graphical user interface) using icons is used in various electronic appliances such as a personal computer (PC) and portable information devices including digital camera, digital video camera, PDA (personal digital (data) assistant), mobile phone, etc.

The GUI using icons is implemented in various forms. For example, there has been proposed an method in which a plurality of icons are disposed circularly on a display screen and a pointer for selection of an icon is moved clockwise or counterclockwise along the train of the icons to a desired icon by operating a rotating means such as a jog dial, to thereby call a function associated with the selected icon (as disclosed in the Japanese Patent Application Laid-pen No. 2002-196867, FIG. 6, for example). Also, there is known a method in which a cursor for selection of an icon is immobilized while a train of icons is moved along a circular orbit to a desired icon by operating a jog dial, to thereby perform a function associated with the selected icon (as disclosed in the Japanese Patent Application Laid-Open No. 2002-196867, FIGS. 10 and 11, for example).

Referring now to FIG. 1, there is schematically illustrated a conventional three-dimensional icon menu screen and movement of a train of icons in the icon menu. In this conventional icon display system, a plurality of icons A0 to A5 are laid on a circular orbit 50 set in a three-dimensional space to provide a perspective, well-visible display of icons and each of the icons A0 to A5 is moved along the circular orbit 50 under a command from the user, as will be known from FIG. 1. Also, in this icon display system, a user-selected number of user-selected types of icons can additionally be called and displayed on the circular orbit 50 on the screen, for example. At this time, all the icons A0 to An including the additional icons will automatically be laid equidistantly on the circuit orbit 50 in order to assure a visibility of all the icons.

However, as the number of icons for display on the screen increases, the adjacent ones of the icons A0 to An will overlap each other as shown in FIG. 2 with the result that the user will not be able to easily discriminate the icons A0 to An. Therefore, the number of icons which can be displayed on the screen is limited in practice.

OBJECT AND SUMMARY OF THE INVENTION

It is therefore an object of the present invention to overcome the above-mentioned drawbacks of the related art by providing a system and method for displaying icons, electronic appliance and computer program, capable of preventing patterns of individual icons from being indiscernible from each other no matter how many icons are set selectable on the display screen, and thus enabling the user to easily select a desired icon.

The above object can be attained by providing an icon display system which displays a plurality of icons movably on a visible circular orbit on a display screen, the system including, according to the present invention, a display icon management means for managing the plurality of icons displayed on the orbit according to a numerical upper limit; a non-display icon management means for managing, in the case where one or more icons in excess of the upper limit are set selectable on the display screen, the one or more icons in excess as an invisible icon or icon train contiguous to the icon train displayed on the orbit; an icon train display updating means for updating an icon train displayed on the orbit according to an external command on the basis of information registered in the display and non-display icon management means, respectively; and a visual-effect means for having an icon newly registered in the non-display icon management means by updating of the icon train displayed on the orbit disappear from the orbit with a visual effect, and having an icon newly registered in the display icon management means appear on the orbit with a visual effect.

According to the present invention, the above icon display system may further be arranged to form a discontinuity of the circular orbit and the visual-effect means be arranged to have an icon newly registered in the non-display icon management means disappear at the discontinuity of the orbit with a visual effect, and having an icon newly registered in the display icon management means appear at the discontinuity of the orbit with a visual effect.

Also the above icon display system may be arranged to update the icon train displayed on the orbit by moving the icon train clockwise and/or counterclockwise along the orbit.

Further, in the case where the number of icons set as ones selectable on the display screen is less than the upper limit, the above icon display system may be arranged to erase the discontinuity from the circular orbit and move the icon train along the orbit according to an external command for moving the icon train.

In the above icon display system, all the icons (icon train) selectable on the display screen can be managed by the display and non-display icon management means to visualize a part of the entire icon train by disposing it on the orbit while holding the other part of the icon train as invisible icons on the display screen and displaying the invisible icons by moving the icon train on the orbit. It is thereby possible to prevent patterns of individual icons from being indiscernible from each other due to overlapping of the icons on the display screen no matter how many icons are set selectable on the display screen.

Also, according to the present invention, some icons can be made to visually disappear at the discontinuity of the orbit by moving the icon train on the orbit and the new icons can be made to appear at the discontinuity to the display screen. By representing the disappearance of icons and appearance of the new icons with a visual effect such as a variation, with time elapse, of shape, color, size or the like of the icons, the user can intuitively recognize the disappearance and appearance of the icons. That is, the user can make an icon selection while always recognizing the existence of the invisible icon train.

Also, the above object can be attained by providing an icon display method in which a plurality of icons are displayed movably on a visible circular orbit on a display screen, the method including, according to the present invention, the steps of providing a display icon management table for managing the plurality of icons displayed on the orbit according to a numerical upper limit and a non-display icon management table for managing, in the case where one or more icons in excess of the upper limit are set selectable on the display screen, the one or more icons in excess as an invisible icon or icon train contiguous to the icon train displayed on the orbit; uspdating an icon train displayed on the orbit according to an external command on the basis of information registered in the display and non-display icon management tables, respectively; and having an icon newly registered in the non-display icon management table, as a result of updating the icon train displayed on the orbit, disappear from the orbit with a visual effect, and having an icon newly registered in the display icon management table, as a result of the updating, appear on the orbit with a visual effect.

According to the present invention, the above icon display method may further be arranged to provide a discontinuity formed in the circular orbit and have an icon newly registered in the non-display icon management table disappear at the discontinuity of the orbit with a visual effect, and have an icon newly registered in the display icon management table appear at the discontinuity of the orbit with a visual effect.

Also the above icon display method may be arranged to update the icon train displayed on the orbit by moving the icon train clockwise and/or counterclockwise along the orbit.

Further, in the case where the number of icons set as ones selectable on the display screen is less than the upper limit, the above icon display method may be arranged to erase the discontinuity from the circular orbit and move the icon train along the orbit according to an external command for moving the icon train.

In the above icon display method, all the icons (icon train) selectable on the display screen can be managed by the display and non-display icon management tables to visualize a part of the entire icon train on the orbit while holding the other part of the icon train as invisible icons on the display screen and displaying the invisible icons, by moving the icon train on the orbit. It is thereby possible to prevent patterns of individual icons from being indiscernible from each other due to overlapping of the icons on the display screen no matter how many icons are set selectable on the display screen.

Also, according to the present invention, some icons can be made to visually disappear at the discontinuity of the orbit by moving the icon train on the orbit and the new icons can be made to appear at the discontinuity to the display screen. By representing the disappearance of icons and appearance of the new icons with a visual effect such as a variation, with time elapse, of shape, color, size or the like of the icons, the user can intuitively recognize the disappearance and appearance of the icons. That is, the user can make an icon selection while always recognizing the existence of the invisible icon train.

Also, the above object can be attained by providing an electronic appliance in which a plurality of icons associated with different functions, respectively, are displayed movably on a visible circular orbit on a display screen, and which implements a function associated with an icon selected on the display screen, the appliance including, according to the present invention, a display icon management means for managing the plurality of icons displayed on the orbit according to a numerical upper limit; a non-display icon management means for managing, in the case where one or more icons in excess of the upper limit are set selectable on the display screen, the one or more icons in excess as an invisible icon or icon train contiguous to the icon train displayed on the orbit; an icon train display updating means for updating an icon train displayed on the orbit according to an external command on the basis of information registered in the display and non-display icon management means, respectively; and a visual-effect means for having an icon newly registered in the non-display icon management means due to updating of the icon train displayed on the orbit disappear from the orbit with a visual effect, and having an icon newly registered in the display icon management means appear on the orbit with a visual effect.

According to the present invention, the above electronic appliance may further include a discontinuity formed in the circular orbit and the visual-effect means may be arranged to have an icon newly registered in the non-display icon management means disappear at the discontinuity of the orbit with a visual effect, and having an icon newly registered in the display icon management means appear at the discontinuity of the orbit with a visual effect.

Also the above electronic appliance may be arranged to update the icon train displayed on the orbit by moving the icon train clockwise and/or counterclockwise along the orbit.

Further, in the case where the number of icons set as ones selectable on the display screen is less than the upper limit, the above electronic appliance may be arranged to erase the discontinuity from the circular orbit and move the icon train along the orbit according to an external command for moving the icon train.

In the above electronic appliance, all the icons (icon train) selectable on the display screen can be managed by the display and non-display icon management means to visualize a part of the entire icon train on the orbit while holding the other part of the icon train as invisible icons on the display screen and displaying the invisible icons by moving the icon train on the orbit. It is thereby possible to prevent patterns of individual icons from being indiscernible from each other due to overlapping of the icons on the display screen no matter how many icons are set selectable on the display screen.

Also, according to the present invention, some icons can be made to visually disappear at the discontinuity of the orbit by moving the icon train on the orbit and the new icons can be made to appear at the discontinuity to the display screen. By representing the disappearance of icons and appearance of the new icons with a visual effect such as a variation, with time elapse, of shape, color, size or the like of the icons, the user can intuitively recognize the disappearance and appearance of the icons. That is, the user can make an icon selection while always recognizing the existence of the invisible icon train.

Also, the above object can be attained by providing a computer program allowing a computer to function as an icon display means for displaying a plurality of icons movably on a visible circular orbit on a display screen; a display icon management means for managing the plurality of icons displayed on the orbit according to a numerical upper limit; a non-display icon management means for managing, in the case where one or more icons in excess of the upper limit are set selectable on the display screen, the one or more icons in excess as an invisible icon or icon train contiguous to the icon train displayed on the orbit; an icon train display updating means for updating an icon train displayed on the orbit according to an external command on the basis of information registered in the display and non-display icon management means, respectively; and a visual-effect means for having an icon newly registered in the non-display icon management means by updating of the icon train displayed on the orbit disappear from the orbit with a visual effect, and having an icon newly registered in the display icon management means appear on the orbit with a visual effect.

In the above computer program, all the icons (icon train) selectable on the display screen can be managed by the display and non-display icon management means to visualize a part of the entire icon train on the orbit while holding the other part of the icon train as invisible icons on the display screen and displaying the invisible icons by moving the icon train on the orbit. It is thereby possible to prevent patterns of individual icons from being indiscernible from each other due to overlapping of the icons on the display screen no matter how many icons are set selectable on the display screen.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

Embodiments of the present invention will be described in detail with reference to the accompanying drawings.

Figure 1:
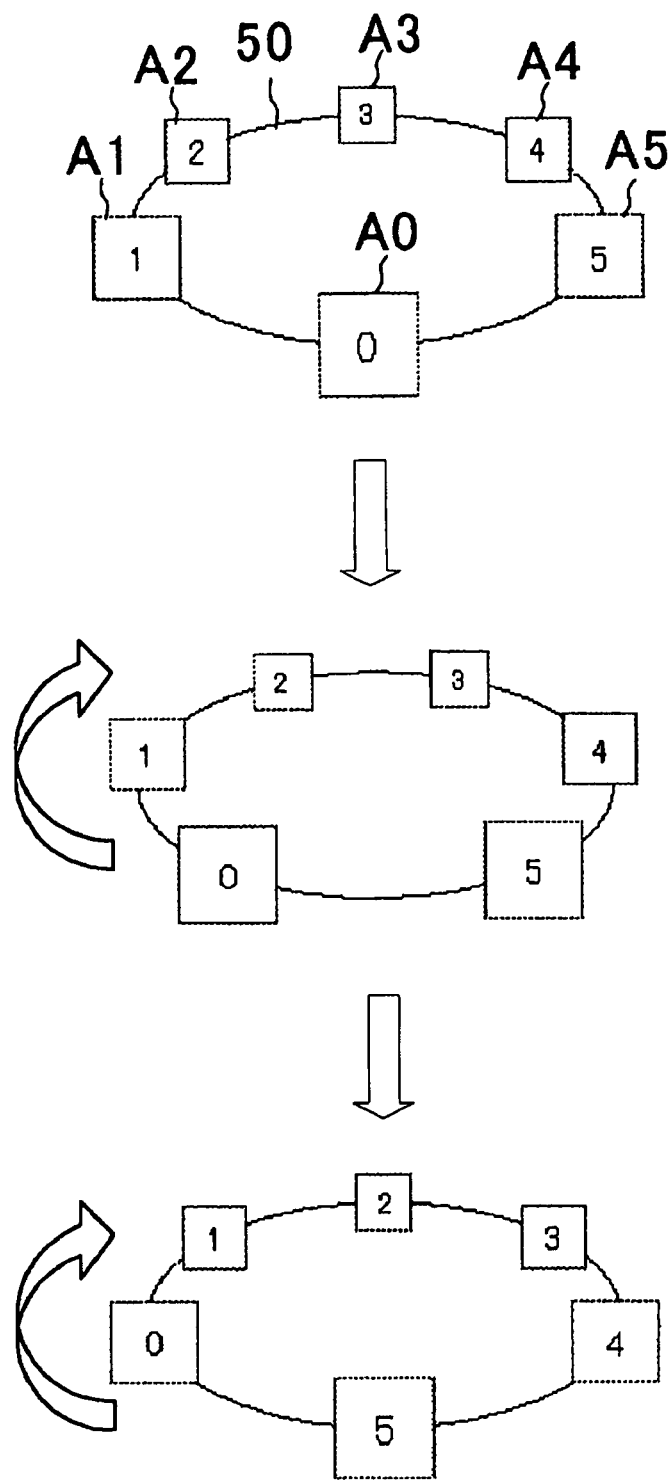
FIG. 1 shows a conventional three-dimensional icon menu screen and movement of a train of icons in the icon menu.
Figure 2:
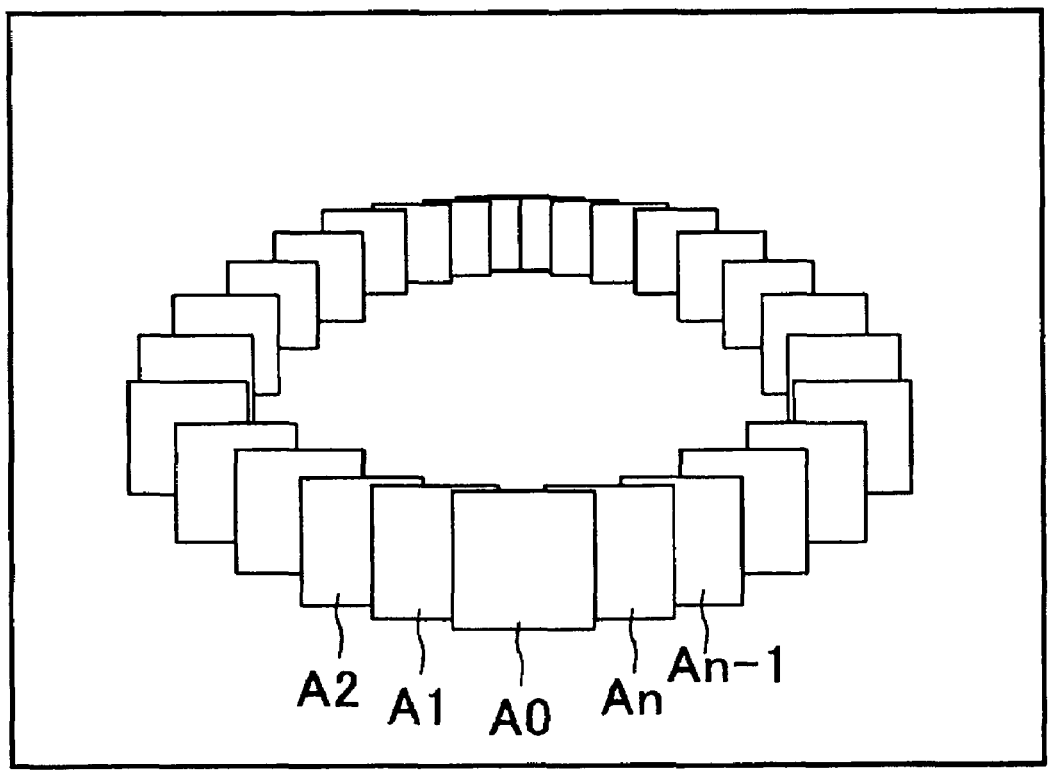
FIG. 2 shows an increase of the number of icons on the conventional three-dimensional icon menu in FIG. 1.
Figure 3:
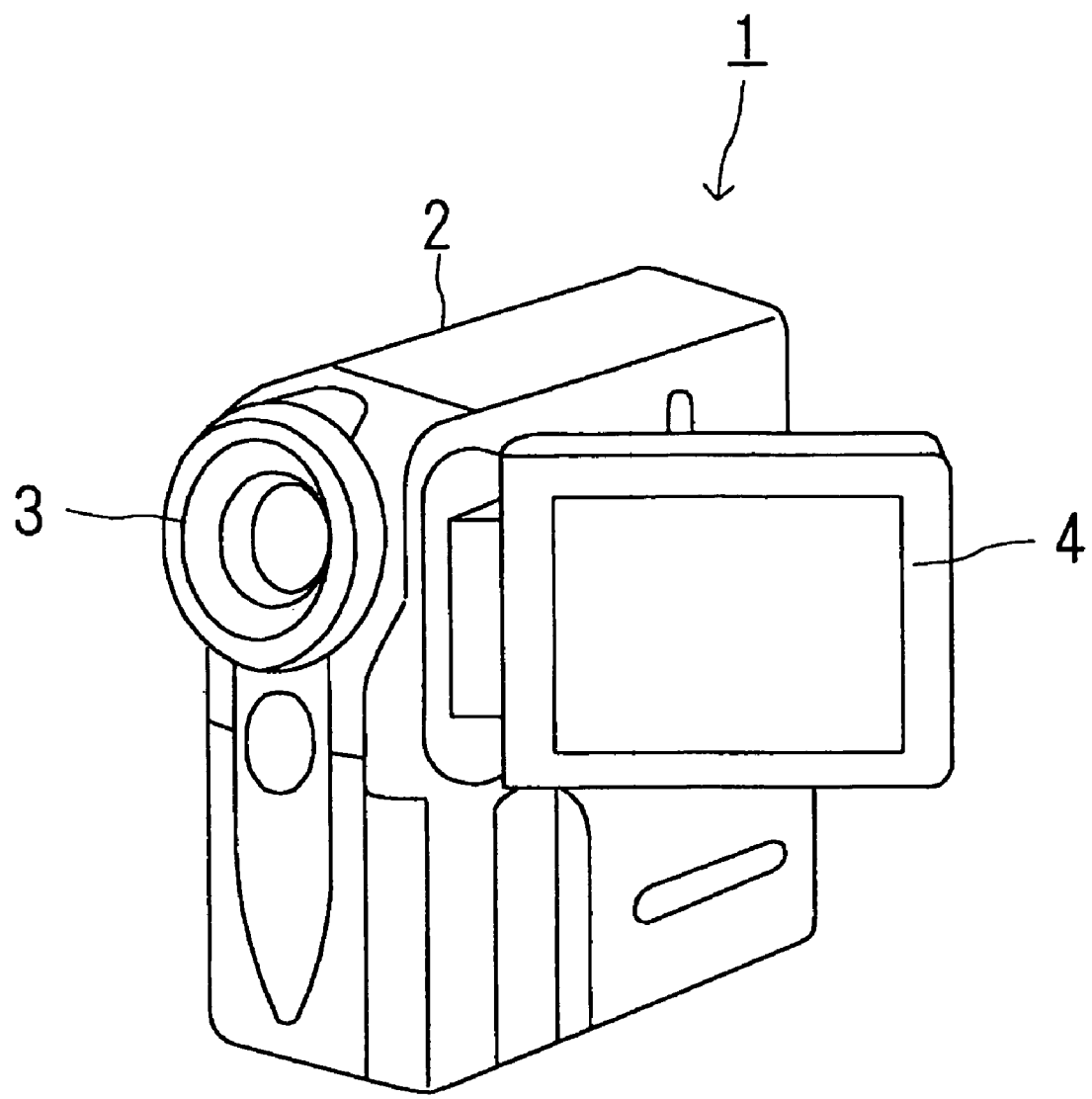
FIG. 3 is a perspective view of a digital video camera/recorder (camcorder) as a first embodiment of the electronic appliance according to the present invention.

Referring to FIG. 3, there is schematically illustrated in the form of a perspective view the digital video camcorder as an embodiment of the electronic appliance according to the present invention.

The digital video camcorder, generally indicated with a reference number 1, includes a body 2 having an appropriate shape and size for the user to operate the digital video camcorder 1 holding the latter in one hand. The body 2 is provided with a lens unit 3, LCD (liquid crystal display) panel 4, and control buttons and switches (not shown). On the LCD panel 4, there is to be displayed an object being captured, an image played back from a storage medium loaded in the digital video camcorder 1 and a stereoscopic icon menu from which the user can select a function to be performed by the digital video camcorder 1.

Figure 4:
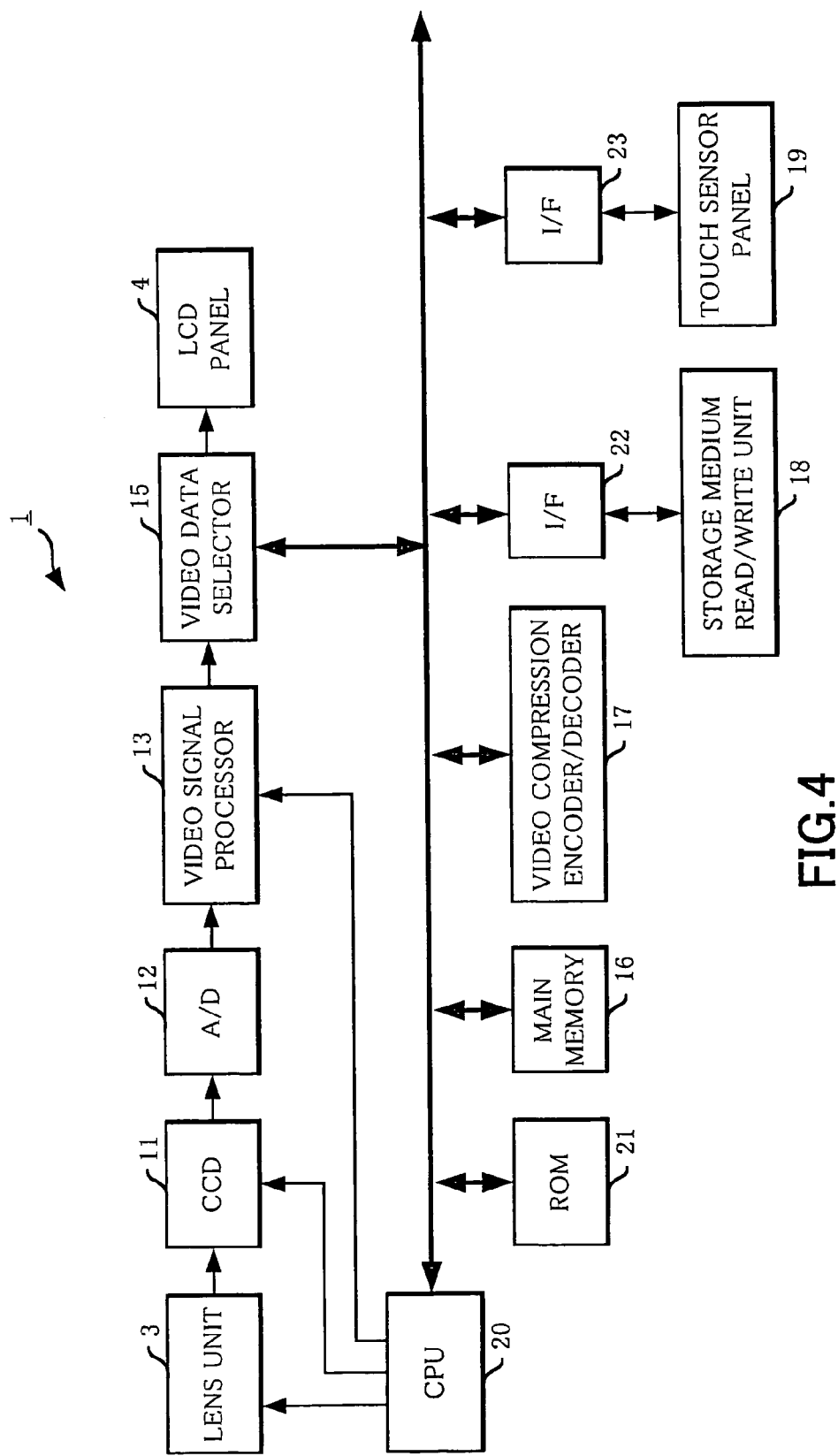
FIG. 4 is a block diagram, showing the electrical connection of the components of the digital video camcorder in FIG. 3.

FIG. 4 is a block diagram, showing the electrical connection in the digital video camcorder 1. As shown, the lens unit 3 and a CCD (charge-coupled device) 11 form together a pickup unit. The lens unit 3 has the aperture and focus thereof automatically controlled with a control signal from a CPU 20. The output from the CCD 11 is converted by an A/D (analog-to-digital) converter 12 into a digital video signal, and then passed to a video signal processor 13. The video signal processor 13 generates RGB signal for each of pixels in the supplied digital video signal, and supplies the RGB signals to the LCD panel 4 via a video data selector 15.

The CPU 20 has connected to a bus 10 thereof a main memory 16, ROM (read-only memory) 21, video compression encoder/decoder 17 and the video data selector 15. The main memory 16 includes a DRAM (dynamic random access memory) or the like and is capable of rapid data read and write. It is used as a working area of the CPU 20, frame buffer or the like. The ROM 21 is a non-volatile memory having various programs and data fixedly stored therein. The video compression encoder/decoder 17 is a circuit module to compress or expand a static image using JPEG (Joint Photographic Experts Group) and a moving image using MPEG (Moving Picture Experts Group), for example. The video data selector 15 selects a destination to which video data is to be transferred.

To the bus 10, there are further connected a storage medium read/write unit 18 to read and write data from and to a storage medium such as a memory stick, smart medium, magnetic tape, hard disk drive or the like, and a touch sensor panel 19 to detect a position the user points with the finger or a pen on the screen of the LCD panel 4 via interfaces (I/F) 22 and 23, respectively.

The CPU 20 controls information transfer between the system components via the bus 10, and it loads a necessary program and data from the ROM 21 to the main memory 16 to control the digital video camcorder 1 according to the program and make a variety of data processing.

Figure 5:
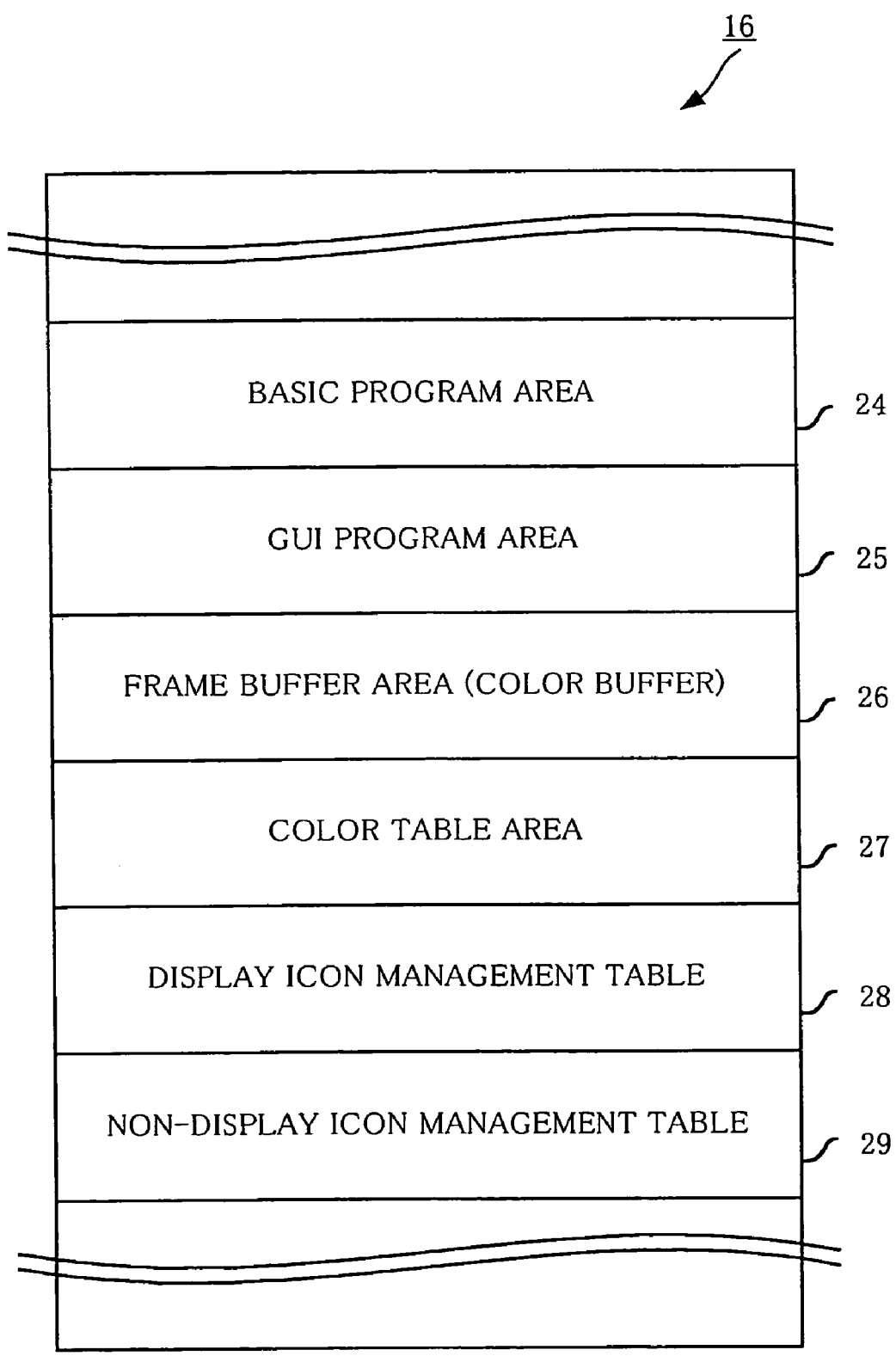
FIG. 5 shows a main memory having program and data areas secured when the icon menu is displayed.

FIG. 5 shows program and data storage areas secured in the main memory 16 when an icon menu is displayed on the screen of the LCD panel 4. As shown, for displaying an icon menu, the main memory 16 has defined therein at least a basic program area 24, GUI program area 25, frame buffer area 26, color table area 27, display icon management table 28 and non-display icon management table 29.

In the basic program area 24, there is stored a basic program for operating the digital video camcorder 1. The GUI program area 25 is an area for storage of programs for implementing GUI (graphical user interface) functions such as manipulating the icon menu display according to the basic program stored in the basic program area 24, recognizing an icon selected by the user having touched the touch sensor panel 19 corresponding to the icon menu being displayed, calling a function program associated with the selected icon from the ROM 21, etc. Individual icons are associated, in a one-to-one relation, with functions which can be performed by the digital video camcorder 1, such as functions of controlling the video recording operation or functions of storing, reading image video data to a storage medium such as a smart medium. When the user selects a desired icon on the icon menu, a function associated with the selected icon will be performed.

The frame buffer area 26 has stored therein image data on the icon menu to be displayed on the screen of the LCD panel 4. The frame buffer area 26 is used as a color buffer for storage of a color number for each pixel. The color table area 27 has stored therein a color number-RGB value correspondence table. An RGB value is called from the color table area 27 correspondingly to a color number stored in the frame buffer area 26, and the RGB value is supplied to the LCD panel 4 via the video data selector 15. The display and non-display icon management tables 28 and 29 will be described in detail later.

Figure 6:
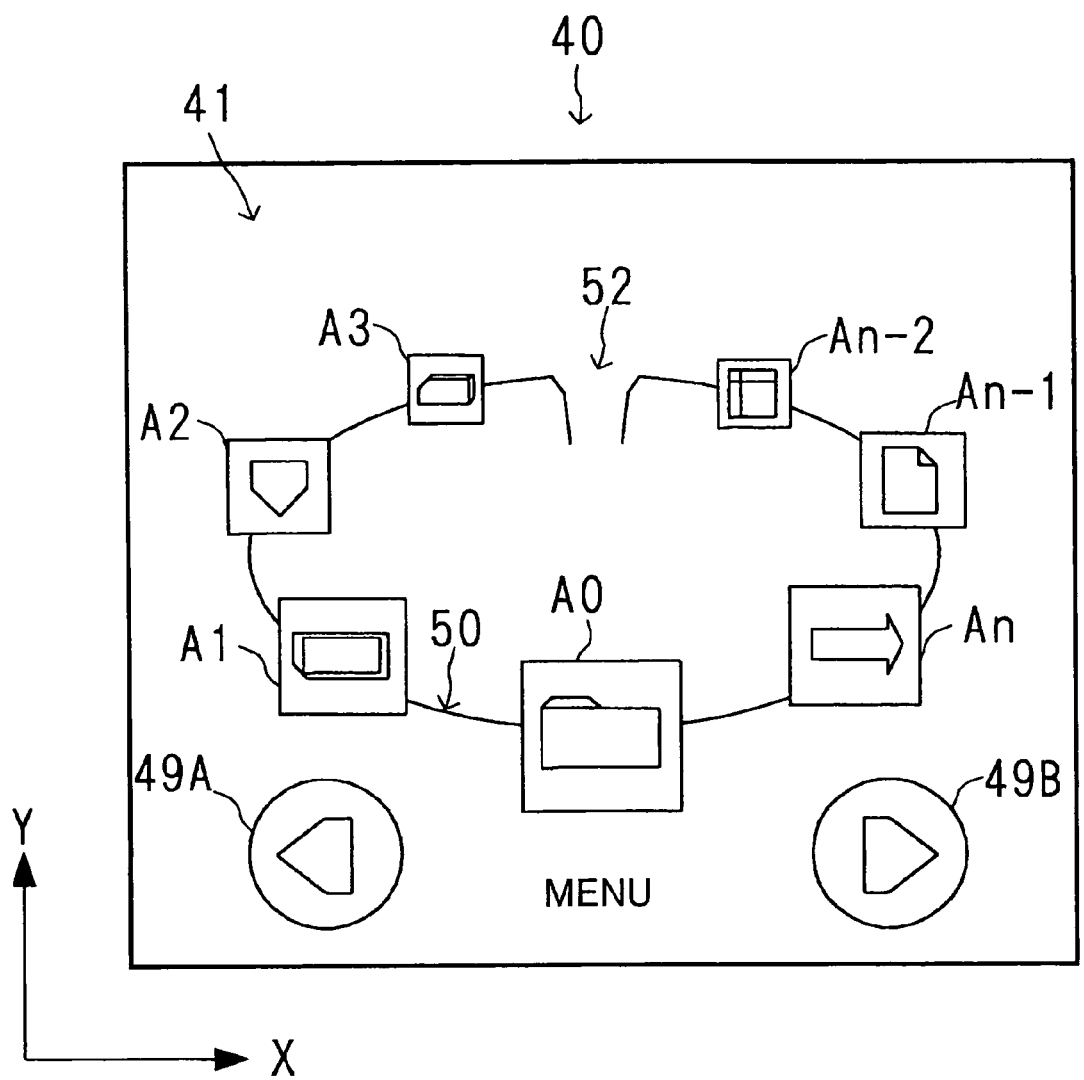
FIG. 6 shows an example of the icon menu.

FIG. 6 shows an example of the icon menu. This icon menu is composed mainly of a background image 41 over a screen 40 of the LCD panel 4, and a plurality of icons (will also be referred to as "icon train" hereunder) A0, A1, A2, A3, An-2, An-1 and An laid in a plurality of dynamically assigned positions on a circular orbit 50. Also, there are provided horizontally on the lower portion of the screen 40 a move button 49A to move the icon train A0 to An clockwise on the orbit 50 and a move button 49B to move the icon train A0 to An counterclockwise on the orbit 50. When the user touches directly the move button 49A or 49B on the screen 40 by the user's finger, pen or the like, the icon train A0 to An is moved clockwise or counterclockwise on the orbit 50 a number of touches the user has made. One touch on the move button 49A or 49B is recognized when the touch sensor panel 19 detects that the user's finger or pen has touched and then left the move button 49A or 49B a set number of times (once, for example) within a set length of time.

Figure 7:
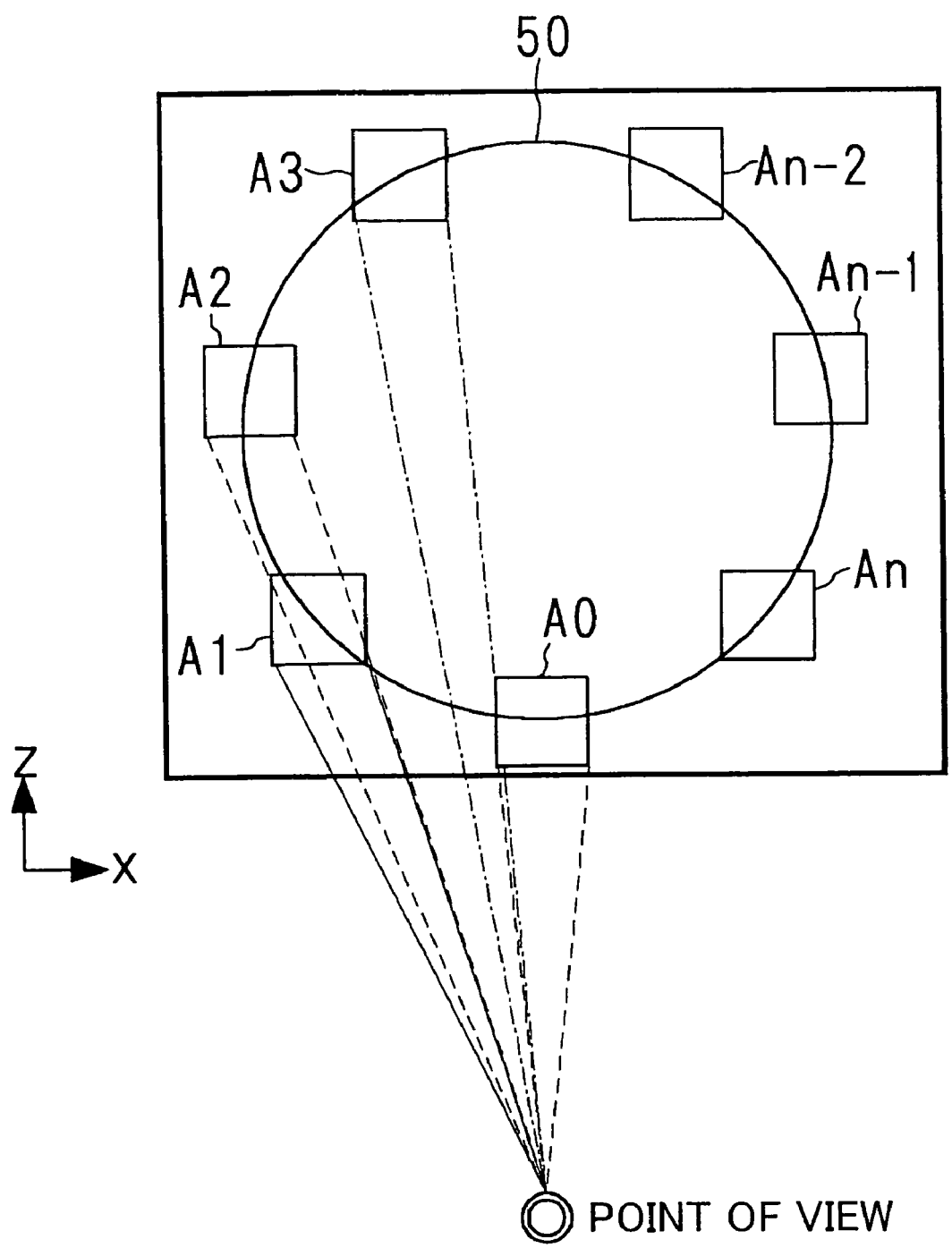
FIG. 7 shows a relation in geometry between the Z- and X-axes of each of the icons shown in FIG. 6.

FIG. 7 shows a relation in geometry among the icons A0 to An in a plane coordinate defined by a Z-axis corresponding to a vertical direction from the user's eyes and an X-axis corresponding to a horizontal direction from the user's eyes. For transformation of a three-dimensional coordinate (X, Y, Z) into a two-dimensional coordinate (X, Y) in rendering three-dimensional model data on icons (which will be described in detail later), there is employed a perspective projection in which consideration is given to relative sizes of the icons A0 to An in a field of view spreading through the screen from the user's eyes. Thus, a perspective can be given in which an icon farther from the user's eyes will appear smaller while an icon nearer to the user's eyes will look larger.

Figure 8:
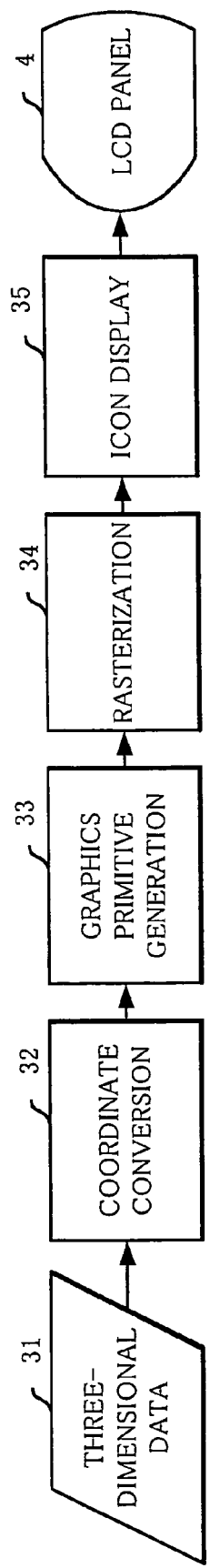
FIG. 8 shows a procedure for rendering a three-dimensional model data on an icon.

Next, the icon rendering by a three-dimensional calculation will be explained. FIG. 8 shows a procedure for rendering a typical three-dimensional model data on an icon.

Model data 31 on an icon, including positions, in a three-dimensional coordinate, of graphics primitives such as a polygon, point, line, plane, etc., attributes of the line and plane, color data, etc. are read from the ROM 21 and three-dimensional coordinates of all points of the icon are converted into two-dimensional coordinates (coordinate conversion 32). Next, the icon data having been converted into the two-dimensional coordinates are sorted in units of a graphics primitive starting with a one farthest from the point of view to finally hold only viewable points. This is called "hidden surface elimination" (graphics primitive generation 33). Then, a color number of each pixel is written to the color buffer on the basis of the icon data having undergone the hidden surface elimination (rasterization 34). From a color table in which the relation between RGB value and color number is stored, a relevant RGB value is called on the basis of a color number of each pixel stored in the color buffer, and converted into video signal which can be processed in the display device. The video signal is displayed on the LCD panel 4 (three-dimensional object display 35).

By the selecting operation, for example, the user can call a desired number of icons of desired types and add them to the circular orbit 50 on the icon menu screen. At this time, the icons are automatically disposed equidistantly from each other on the circular orbit 50 in order to assure the visibility of each icon. However, an upper limit is given to the number of icons that can be disposed on the orbit 50, and the upper limit in this embodiment is "seven" by way of example. In the case where the number of icons called by the user exceeds the upper limit, they will be handled as invisible ones on the icon menu screen. Such invisible icons will be explained herebelow.

Figure 9A:
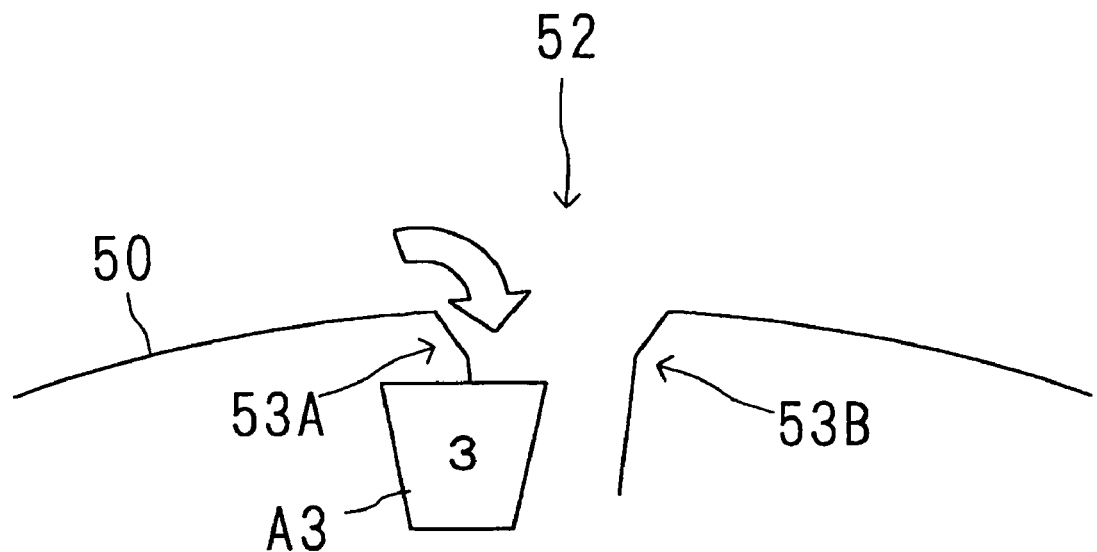
FIGS. 9(a) and 9(b) show disappearance and appearance of an icon at a discontinuity of an orbit of movement.
Figure 9B:
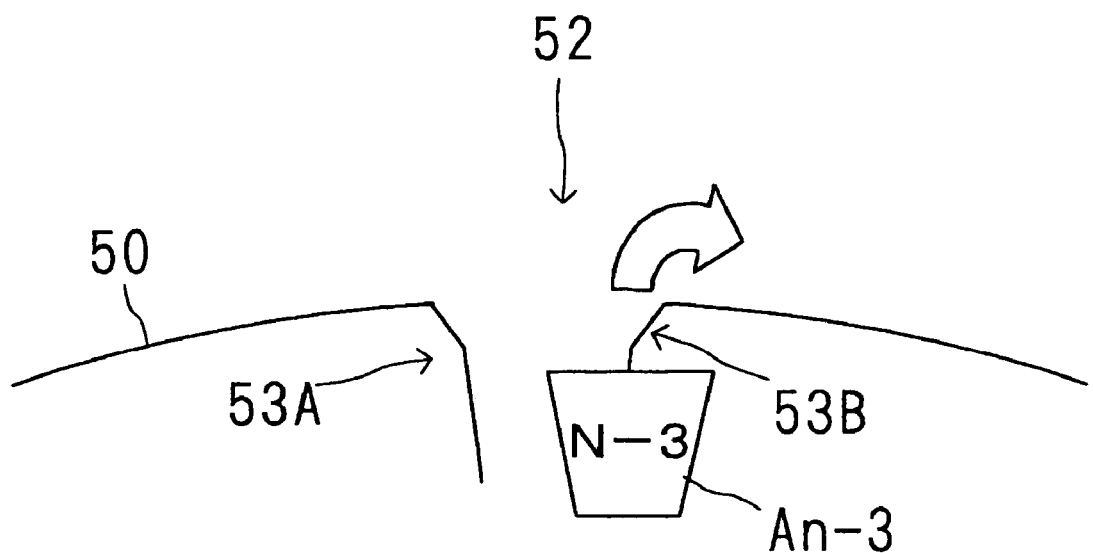

FIGS. 9(*a*) and 9(*b*) show the circular orbit 50 discontinued at a portion indicated with a reference number 52. As shown, each of ends 53A and 53B of the orbit 50 across the discontinuity 52 is bent inwardly of the orbit 50. For clockwise movement of the icon train, the icon A3 as a top icon in the clockwise direction on the orbit 50 moves along the profile of the left end 53A of the orbit 50 into a space enclosed by the orbit 50 as shown in FIG. 9(*a*). The icon A3 will visually disappear as if it were absorbed into the space enclosed by the orbit 50. On the other hand, a new icon An-3 appears along the profile of the right end 53B of the orbit 50 from inside the space enclosed by the orbit 50 and added as a bottom icon in the clockwise direction on the orbit 50 as shown in FIG. 9(*b*).

That is, an icon train contiguous to an icon train currently displayed on the screen looks as if it existed invisibly in the space enclosed by the orbit 50, and the user can intuitively recognize that he or she can freely select an icon train to be displayed by moving the icon train.

The display icon management table 28 registers numbers for the icons being currently displayed on the screen in the order of them disposed in the train on the orbit 50, and the non-display icon management table 29 registers numbers for icons not being currently displayed in an order of them which would be on the orbit 50. The "icon numbers" may be numbers assigned to icons in an order in which the user has called the respective icons to the icon menu screen, for example. Namely, the numbers for the icons correspond directly to the clockwise order of the icons in the icon train. The icon numbers can freely be changed by the user making a changing operation. The CPU 20 registers the icon numbers to the display and non-display icon management tables 28 and 29 or deletes them from these tables 28 and 29, and disposes the icon train on the orbit 50 according to the contents of the display and non-display icon management tables 28 and 29.

Figure 10:
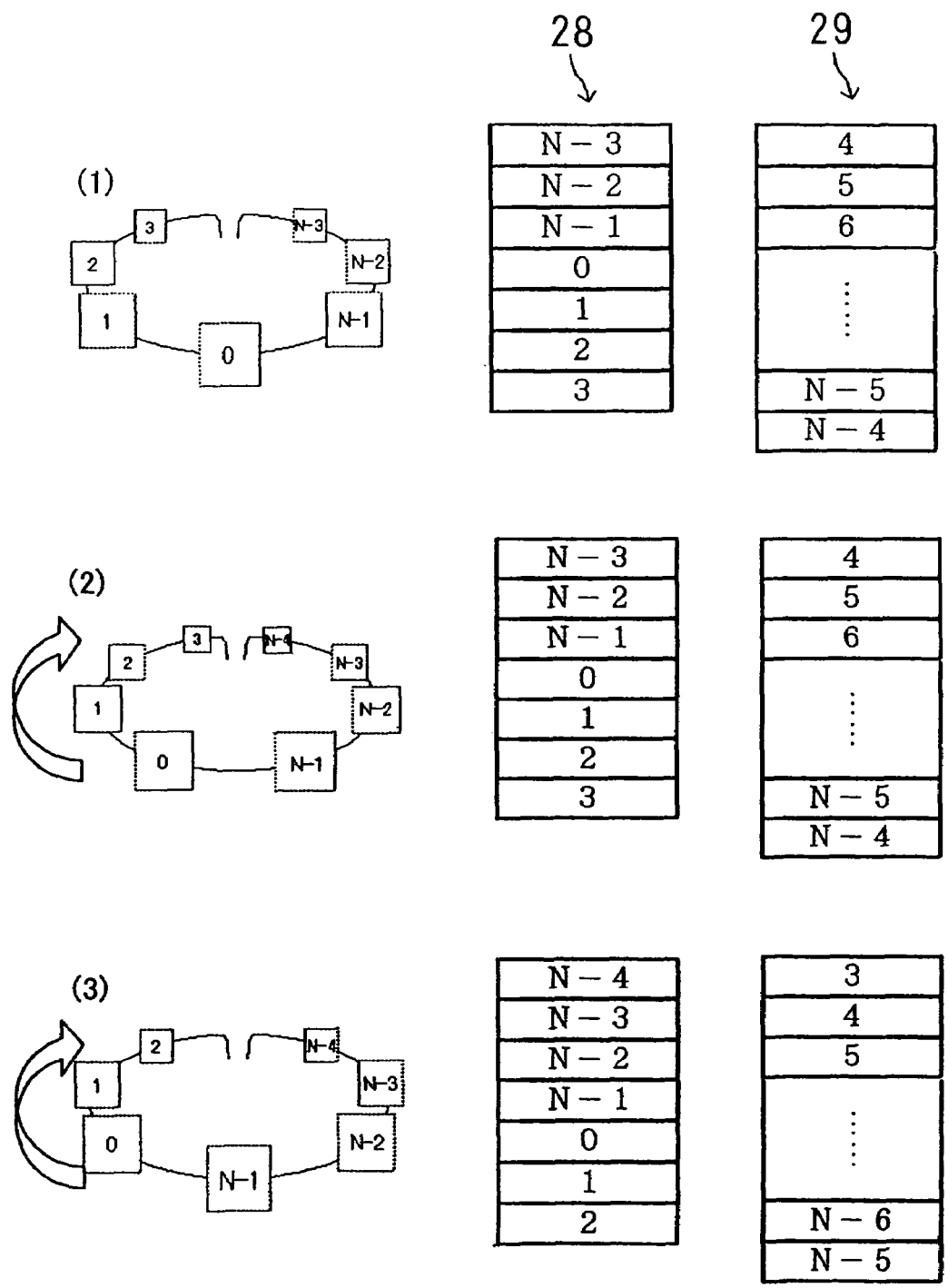
FIG. 10 shows a movement of an icon train displayed on an orbit on the screen, and change in state of display icon management table and non-display icon management table.

FIG. 10 shows movement of an icon train displayed on the orbit 50 on the screen, and change in state of the display and non-display icon management tables 28 and 29.

As shown, N icons having numbers of 0 to N-1 are set selectable. In a state (1), seven icons having Nos. 0, 1, 2, 3, N-3, N-2 and N-1, respectively, are displayed on the orbit 50. Therefore, the display icon management table 28 has registered therein the numbers for these seven icons. The non-display icon management table 29 has registered therein the numbers 4, 5, 6, . . . , N-5, N-4 for the other icons.

When the user gives a command for moving the icon train once in the clockwise direction, the CPU 20 will move the number N-4 for the last icon in the non-display icon management table 29 to the top of the display icon management table 28, while moving the number 3 for the last icon in the display icon management table 28 to the top of the non-display icon management table 29. At this time, the CPU 20 updates the display of the icon train on the orbit 50 according to the icon numbers registered in the display icon management table 28.

More specifically, first the icon train on the orbit 50 moves by a half of an icon as in a state (2) twice, and finally moves by one icon in the clockwise direction as in a state (3). At this time, the icon No. 3 positioned at the top in the clockwise direction on the orbit 50 before having moved moves along the profile of the left end 53A of the orbit 50 into the space enclosed by the orbit 50 as shown in FIG. 7 and visually disappear from the screen as if it were absorbed into the space enclosed by the orbit 50. On the other hand, a new icon having a number N-4 appears along the profile of the right end 53B from inside the space enclosed by the orbit 50, and is added as the last icon in the clockwise direction on the orbit 50.

Note that for the user to be able to intuitively recognize the disappearance and appearance of an icon at the discontinuity 52 of the orbit 50, the shape, color, size, etc. of an appearing or disappearing icon are gradually changed as the icon moves. This is an animation-aided visual manipulation of an image.

Figure 11:
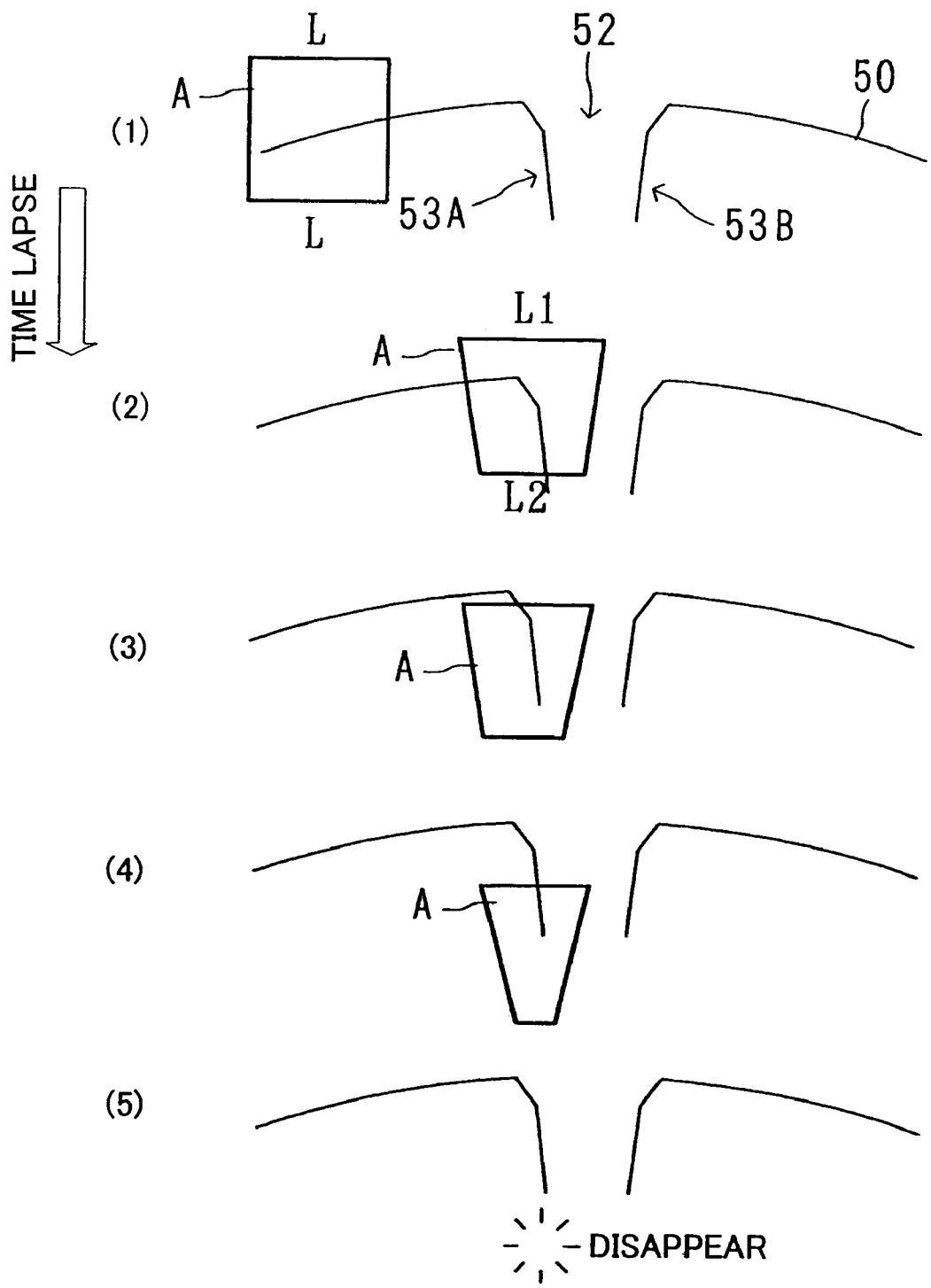
FIG. 11 shows the visual effect at disappearance of an icon at a discontinuity of the orbit.

FIG. 11 shows an example of the visual effect of the animation of an icon. The icon before manipulated for the visual effect ("A" in a state (1)) has a upper side and lower side equal in length to each other. The length is taken as "L". When the icon A moves along the profile of the left end 53A at the discontinuity 52 towards the space enclosed by the orbit 50, the lengths L1 and L2 of the upper and lower sides, respectively, of the icon A (in states (2), (3) and (4)) at a time t from the start of deformation may be determined as will be described below:

$$L1=(1-(t/T))L$$

$$L2=(1-(t/T))2L$$

where T is a time taken from the start of icon deformation until disappearance. By gradually deforming the icon by changing the lengths of the upper and lower sides of the icon as the time elapses, it is possible to provide a visual effect under which the icon looks as if it were absorbed along the orbit 50 into the space enclosed by the orbit 50. Also, an icon appearing from inside the space enclosed by the orbit 50 is deformed similarly by changing the lengths of the upper and lower sides thereof as the time elapses. Of course, different visual effects may be used for a disappearing icon and appearing icon, respectively. Also, an icon may be made to disappear and appear in the same timing, an icon may be made to appear after an icon has been made to disappear or an icon may be made to disappear after an icon has been made to appear.

Figure 12:
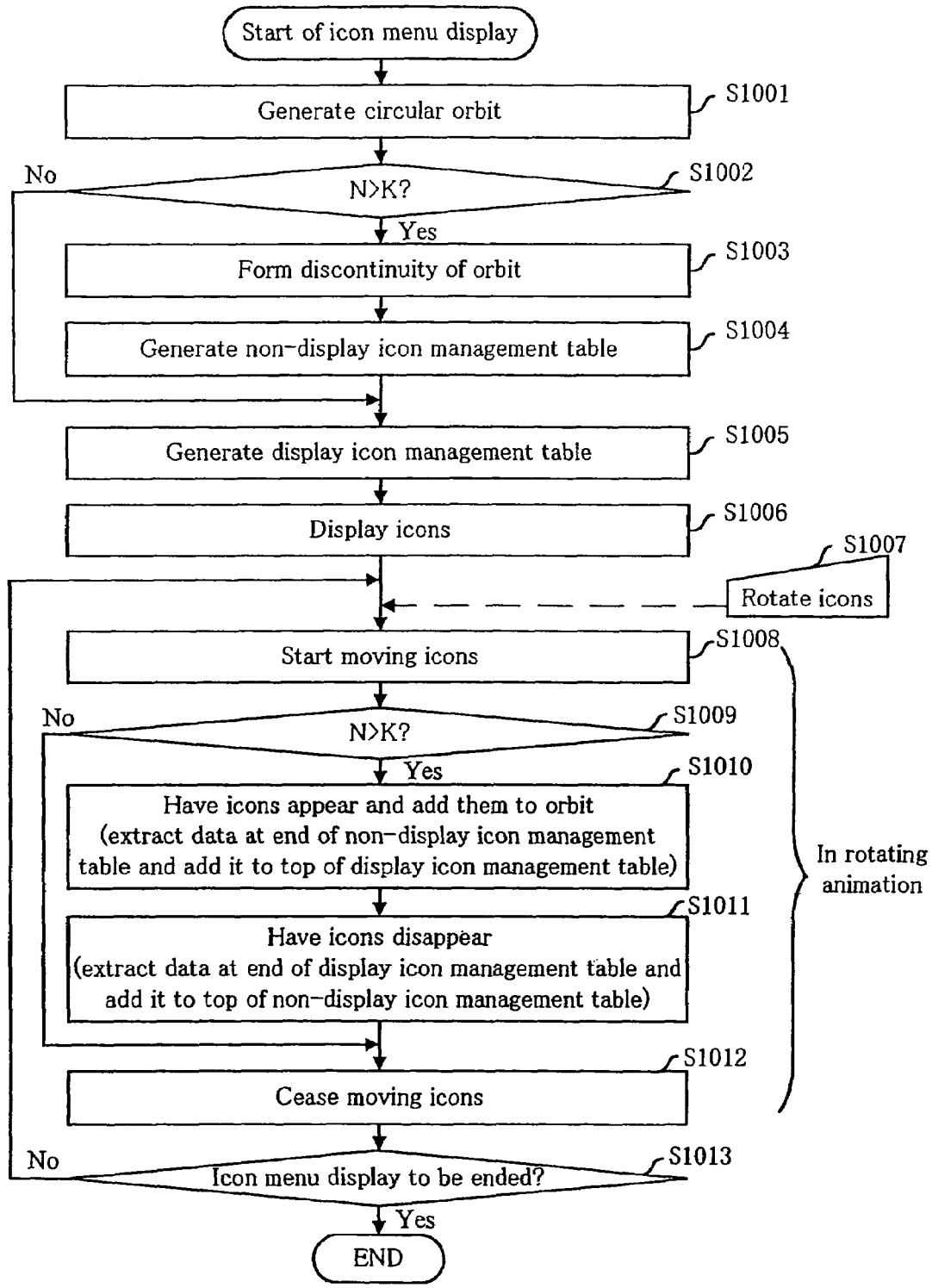
FIG. 12 shows a flow of operations made in displaying icons.

Next, the operations made in displaying icons will be described with reference to FIG. 12 showing a flow of operations made in displaying icons. It is assumed here that the user has set types and number of icons selectable on the icon menu screen. However, it should be noted that not all the icons displayable on the icon menu screen are of different types.

When the GUI program is called, the CPU 20 generates, on the screen, an orbit 50 on which icons are to be disposed, according to the GUI program in step S1001. The orbit 50 may take a loop or endless form such as a circle, ellipse, polygon or the like. The system may be arranged so that some forms of the orbit may be prepared, of which the user can choose a desired one.

Next in step S1002, the CPU 20 reads the preset number N of icons selectable on the icon menu screen, according to the GUI program, and judges whether the value N is larger than an upper limit K of the number of icons that can be displayed on the orbit 50. When the result of judgment in step S1002 is N>K, the CPU 20 will form the discontinuity 52 in the orbit 50 in step S1003, and generate the non-display and display icon management tables 29 and 28 in this order in steps S1004 and S1005, respectively. However, if the result of judgment is other than N>K, the CPU 20 will generate the display icon management table 28 in step S1005 without generating the discontinuity 52 and non-display icon management table 29.

Figure 13:
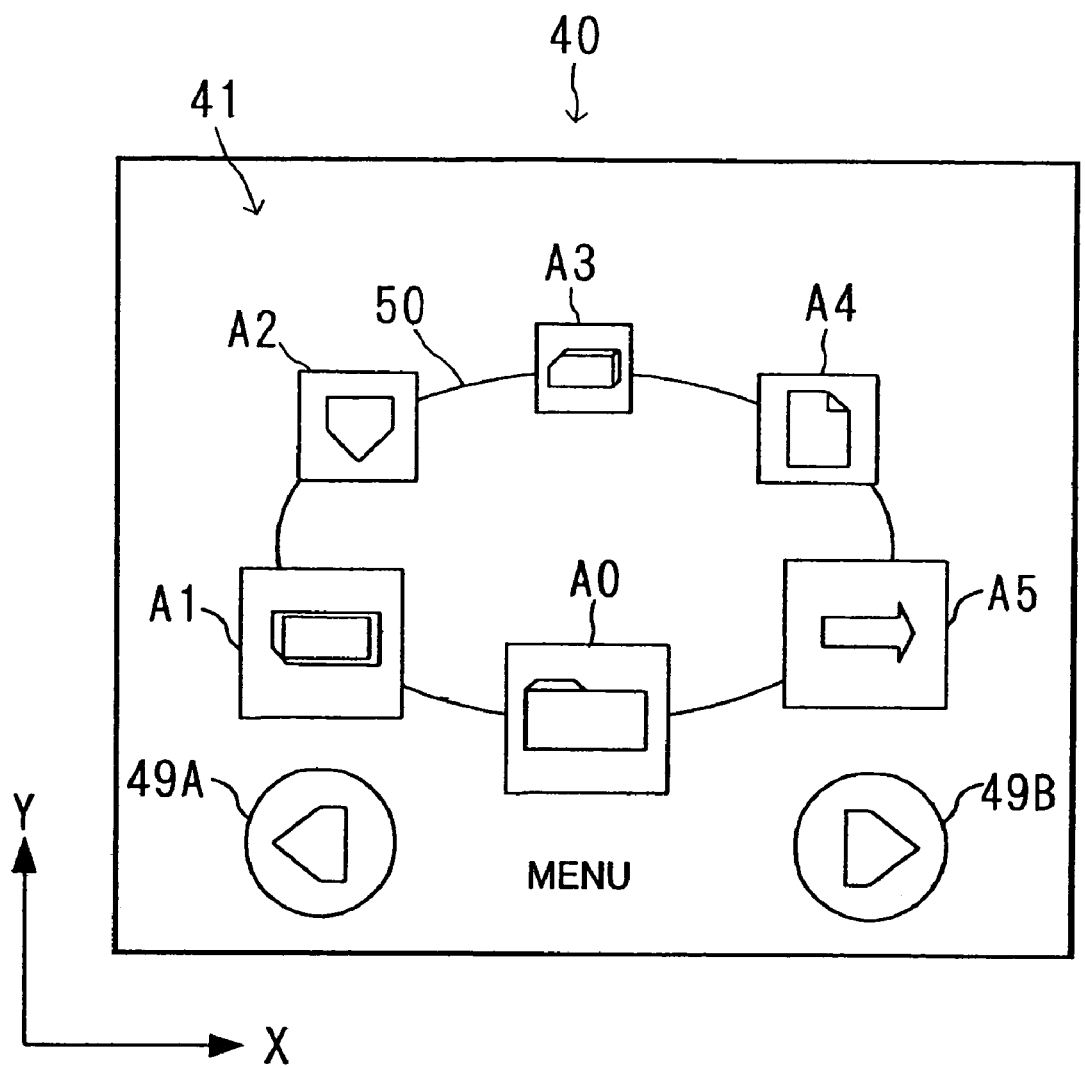
FIG. 13 shows an example of the icon menu screen when the orbit is not discontinued.

Next in step S1006, the CPU 20 dispose and display N icons equidistantly on the orbit according to the GUI program. Thereby, when the result of judgment in step S1002 is N>K, the CPU 20 provides an icon menu screen as shown in FIG. 6 and FIG. 10 (1). If the result of judgment is other than N>K, for example, if K=7 and N=6, the CPU 20 will provide an icon menu screen as shown in FIG. 13.

When the user operates the icon once in step S1007, the icon train called to the icon menu screen is put into clockwise or counterclockwise movement in step S1008. If the result of judgment is other than N>K ("No" in step S1009), the icon train on the orbit 50 is only moved as it is clockwise or counterclockwise by one icon. However, when the result of judgment is N>K ("Yes" in step S1009) and if the user instructs to move the icon train clockwise, an icon appears from the right of the discontinuity 52 in the orbit 50 and is added as a last icon in the clockwise direction on the orbit 50 in step S1010, and then an icon used to exist at the top in the clockwise direction on the orbit 50 before the icon train is moved is made to visually disappear at the discontinuity 52 of the orbit 50 in step S1011 as if it were absorbed into the space enclosed by the orbit 50. If the user instructs to move the icon train counterclockwise, an icon appears at the left of the discontinuity 52 of the orbit 50 and is added as a last icon in the counterclockwise direction on the orbit 50 in step S1010, and then an icon used to be at the top in the counterclockwise direction on the orbit 50 before the icon train is moved is made to visually disappear at the discontinuity 52 of the orbit 50 in step S1011. Thus, the icon train movement in response to the user's instruction for one movement of the icon train is complete in step S1012.

Thereafter, each time the user instructs for one movement of the icon train, the operations in steps S1008 to S1012 will be repeatedly done until an instruction is given to exit the icon menu screen display in step S1013.

Since the digital video camcorder 1 as the embodiment of the present invention is designed to manage the entire train of all icons (icon train) selectable on the icon menu screen by the display and non-display icon management tables 28 and 29, dispose and visualize a part of the entire icon train on the orbit 50 while holding the remainder of the icon train as invisible icons and make the invisible icons appear on the screen by moving the icon train on the orbit 50, it is possible to prevent patterns of individual icons from being indiscernible from each other due to overlapping of the icons on the screen no matter how many icons are set selectable on the screen.

Also, according to this embodiment, some icons can be made to visually disappear at the discontinuity 52 of the orbit 50 by moving the icon train on the orbit 50 and the new icons can be made to appear from the discontinuity 52 of the orbit 50. By representing the disappearance of icons and appearance of the new icons with a visual effect such as a variation, with time elapse, of shape, color, size or the like of the icons at this time, the user can intuitively recognize the disappearance and appearance of the icons. That is, the user can make an icon selection while always recognizing the existence of the invisible icon train.

Note that although the present invention has been described concerning the stereoscopic icon menu display, it is also applicable to a plane icon menu display.

Also, in the icon display manipulation shown in FIG. 12, the number N of icons selectable on the icon menu screen is compared with the upper limit K of the icons that can be disposed on the orbit 50 to make a selection between an icon display method in which the discontinuity 52 is formed in the orbit 50 to hold invisible icons and a method in which the icon train is only moved on the orbit 50. However, the system may be designed such that one of the above icon display methods can be selected according to angles of division of a circle calculated for disposing a plurality of icons selectable on the icon menu screen equidistantly on the orbit 50.

Figure 14:
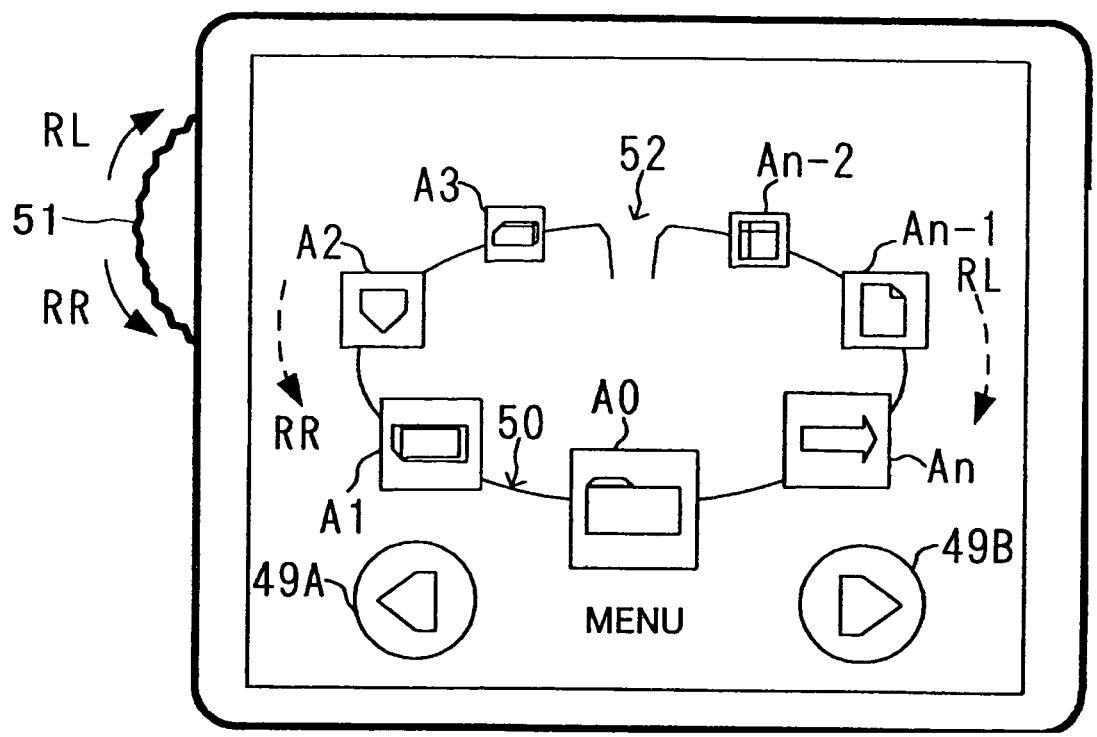
FIG. 14 shows a jog dial used for input of a user's command for movement of an icon train.

FIG. 14 shows a jog dial 51 as an alternative means for input of a user's command for movement of an icon train. As shown, the jog dial 51 is provided to enter a user's command for moving the icons A0 to An along the orbit 50. The jog dial 51 has a part thereof projected from one side of the LCD panel 4, for example, and is freely rotatable. The user can rotate the jog dial 51 with the finger applied to the projecting portion of the jog dial 51. The direction and angle of rotation of the jog dial 51 are recognized by the CPU 20, and the icons A0 to An are moved along the orbit 50 correspondingly to the result of recognition.

In the foregoing, the present invention has been described in detail in accordance with certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

As having been described in the foregoing, according to the present invention, all the icons (icon train) selectable on the display screen can be managed by the display and non-display icon management means to visualize a part of the entire icon train by disposing it on the orbit while holding the other part of the icon train as invisible icons on the display screen and displaying the invisible icons by moving the icon train on the orbit. It is thereby possible to prevent patterns of individual icons from being indiscernible from each other due to overlapping of the icons on the display screen no matter how many icons are set selectable on the display screen.

Also, according to the present invention, some icons can be made to visually disappear at the discontinuity of the orbit and a new icon can be made to appear at the discontinuity to the display screen by moving the icon train on the orbit. By representing the disappearance of icons and appearance of the new icons with a visual effect such as a variation, with time elapse, of shape, color, size or the like of the icons at this time, the user can intuitively recognize the disappearance and appearance of the icons. That is, the user can make an icon selection while always recognizing the existence of the invisible icon train.

What is claimed is:

1. An icon display system which displays a movable plurality of icons in a circular orbit as an icon train on a display screen, the system comprising:
    means for managing the plurality of icons displayed in the orbit according to a numerical upper limit;
    means for managing, one or more displayed icons in excess of the upper limit as an invisible icon or icon train that is contiguous to the icon train displayed in the orbit;
    means for updating the icon train displayed in the orbit according to an external command; and
    means for having an icon newly registered as invisible disappear from the orbit with visual effect, and having an icon newly registered as visible appear in the orbit with visual effect wherein,
    a discontinuity is formed in the circular orbit and the icon newly registered as invisible disappears at the discontinuity of the orbit with visual effect, while the icon newly registered as visible appears at the discontinuity of the orbit with visual effect.

2. The icon display system as set forth in claim 1, wherein the icon train displayed on the orbit is updated by moving the icon train clockwise and/or counterclockwise along the orbit.

3. The icon display system as set forth in claim 1, wherein in a case where the number of icons set as ones selectable on the display screen is less than the upper limit, the discontinuity is erased from the circular orbit and the icon train is moved along the orbit according to an external command for moving the icon train.

4. An icon display method in which a plurality of icons are displayed movably in a circular orbit as an icon train on a display screen, the method comprising:
    providing a display icon management table for managing the plurality of icons displayed in the orbit according to a numerical upper limit;
    providing a non-display icon management table for managing, one or more displayed icons in excess of the upper limit as an invisible icon or icon train that is contiguous to the icon train displayed in the orbit;
    updating the icon train displayed in the orbit according to an external command on the basis of information registered in the display and non-display icon management tables, respectively; and
    having an icon newly registered in the non-display icon management table, as a result of updating the icon train displayed on the orbit, disappear from the orbit with visual effect, and having an icon newly registered in the display icon management table, appear in the orbit with a visual effect wherein,
    a discontinuity is formed in the circular orbit and an icon newly registered in the non-display icon management table is made to disappear at the discontinuity of the orbit with visual effect, while an icon newly registered in the display icon management table is made to appear at the discontinuity of the orbit with visual effect.

5. The icon display method as set forth in claim 4, wherein the icon train displayed on the orbit is updated by moving the icon train clockwise and/or counterclockwise along the orbit.

6. The icon display method as set forth in claim 4, wherein in a case where the number of icons set as ones selectable on the display screen is less than the upper limit, the discontinuity is erased from the circular orbit and the icon train along the orbit is moved according to an external command for moving the icon train.

7. An electronic appliance in which a plurality of icons associated with different functions, respectively, are displayed movably in a circular orbit on a display screen, and which implements a function associated with an icon selected on the display screen, the appliance comprising:
  means for managing the plurality of icons displayed in the orbit according to a numerical upper limit;
  means for managing one or more displayed icons in excess of the upper limit as an invisible icon or icon train that is contiguous to the icon train displayed in the orbit;
  means for updating the icon train displayed in the orbit according to an external command; and
  means for having an icon newly registered as invisible disappear from the orbit with visual effect, and having an icon newly registered as visible appear in the orbit with visual effect; wherein,
  a discontinuity is formed in the circular orbit and the icon newly registered as invisible disappears at the discontinuity of the orbit with visual effect, while the icon newly registered as visible appears at the discontinuity of the orbit with visual effect.

8. The electronic appliance as set forth in claim 7, wherein the icon train displayed on the orbit is updated by moving the icon train clockwise and/or counterclockwise along the orbit.

9. The electronic appliance as set forth in claim 7, wherein in a case where the number of icons set as ones selectable on the display screen is less than the upper limit, the discontinuity is erased from the circular orbit and the icon train along the orbit is moved according to an external command for moving the icon train.

10. A computer readable media storing a computer program, that when run on a processor causes the processor to perform a method, the method comprising:
  displaying a movable plurality of icons in a circular orbit on a display screen;
  managing the plurality of icons displayed in the orbit according to a numerical upper limit;
  managing one or more displayed icons in excess of the upper limit as an invisible icon or icon train that is contiguous to the icon train displayed in the orbit;
  updating the icon train displayed in the orbit according to an external command; and
  having an icon newly registered as invisible disappear from the orbit with visual effect, and having an icon newly registered as visible appear in the orbit with visual effect; wherein,
  a discontinuity is formed in the circular orbit and the icon newly registered as invisible disappears at the discontinuity of the orbit with visual effect, while the icon newly registered as visible appears at the discontinuity of the orbit with visual effect.

* * * * *